US006814989B2

(12) United States Patent
Teran

(10) Patent No.: US 6,814,989 B2
(45) Date of Patent: Nov. 9, 2004

(54) METHOD FOR TENDERIZING PORK

(76) Inventor: James F. Teran, 8972 Kittiwake St., Highlands Ranch, CO (US) 80126

( * ) Notice: Subject to any disclaimer, the term of this patent is extended or adjusted under 35 U.S.C. 154(b) by 0 days.

(21) Appl. No.: 09/982,570

(22) Filed: Oct. 16, 2001

(65) Prior Publication Data

US 2003/0211203 A1 Nov. 13, 2003

(51) Int. Cl.$^7$ .............................. C12N 9/48; A23L 1/318
(52) U.S. Cl. ............................ 426/58; 426/56; 426/574; 426/63; 426/212
(58) Field of Search ............................... 426/58, 56, 63, 426/574, 212, 59, 281, 410, 413, 415

(56) References Cited

U.S. PATENT DOCUMENTS

| | | | |
|---|---|---|---|
| 2,140,781 A | 12/1938 | Allen | 99/107 |
| 2,321,623 A | 6/1943 | Ramsbottom et al. | 99/107 |
| 2,471,282 A | 5/1949 | Paddock | 99/107 |
| 2,963,376 A | 12/1960 | Hogan et al. | 99/187 |
| 2,999,020 A | 9/1961 | Williams | 99/107 |
| 3,147,123 A | 9/1964 | Komarik | 99/107 |
| 3,166,423 A | 1/1965 | Sleeth | 99/107 |
| 3,188,213 A | 6/1965 | Delaney | 99/107 |
| 3,533,803 A | 10/1970 | Schack et al. | 99/107 |
| 3,798,334 A | 3/1974 | Earl et al. | 426/58 |
| 4,066,790 A | 1/1978 | Connick et al. | 426/8 |
| 4,313,963 A | 2/1982 | Greenspan | 426/58 |
| 4,539,210 A | 9/1985 | O'Connell et al. | 426/58 |
| 5,512,015 A | 4/1996 | Teran | 452/141 |
| 6,015,580 A | 1/2000 | Mays | 426/281 |
| 6,040,013 A | 3/2000 | Karales | 427/281 |
| 6,319,527 B1 | 11/2001 | Purser | 426/63 |
| 6,537,598 B1 * | 3/2003 | Teran | 426/58 |

* cited by examiner

*Primary Examiner*—Keith Hendricks

(57) ABSTRACT

A method of tenderizing pork comprising providing an amount of pork and treating the pork with a composition comprising an enzyme mixture consisting of bromelin, ficin and papain.

37 Claims, No Drawings

METHOD FOR TENDERIZING PORK

BACKGROUND

A large portion of commercially raised pork is limited in value because conventional preparation methods result in meat that is unacceptably tough and dry. A variety of methods have been used to tenderize naturally tough pork, such as mechanically interrupting the muscle fibers of the pork. However, none of these methods have produced a pork product that can be cooked using conventional preparation methods, and that results in a post-preparation product that is consistently tender and suitable for human consumption.

Therefore, it would be useful to have a method of tenderizing pork so that the pork can be cooked using conventional methods, and that results in a post-preparation pork product that is consistently tender and suitable for human consumption.

SUMMARY

According to one embodiment, there is provided a method of tenderizing pork, the method comprising providing an amount of pork, and treating the pork with a composition comprising an enzyme mixture where the enzyme mixture consists of between about 98.7% and about 99.7% bromelin, between about 0.02% and about 0.08% ficin and between about 0.01% and about 0.05% papain. In one embodiment the enzyme mixture consists of between about 98.7% and about 99.7% bromelin, between about 0.02% and about 0.08% ficin and between about 0.01% and about 0.05% papain. In another embodiment, the enzyme mixture consists of between about 99% and about 99.4% bromelin, between about 0.04% and about 0.06% ficin and between about 0.02% and about 0.04% papain. In a preferred embodiment, the enzyme mixture consists of about 98.2% bromelin, about 0.05% ficin and about 0.03% papain.

In one embodiment, the enzyme mixture is present in an amount of between about 0.5% and about 6% of the composition. In another embodiment, the enzyme mixture is present in an amount of between about 0.7% and about 2% of the composition. In a preferred embodiment, the enzyme mixture is present in an amount of about 1% of the composition.

In another embodiment, the composition used to treat the pork additionally comprises a carrier, such as NaCl. In a preferred embodiment, the carrier is present in an amount of between about 25% and about 99% of the composition or in an amount of between about 50% and about 99% of the composition. In a particularly preferred embodiment, the carrier is present in an amount of about 98.5% of the composition.

In one embodiment, the composition used to treat the pork additionally comprises a processing aid, such as soybean oil. In a preferred embodiment, the processing aid is present in an amount of between about 0.1% and about 2% of the composition. In another preferred embodiment, the processing aid is present in an amount of between about 0.3% and about 1% of the composition. In a particularly preferred embodiment, the processing aid is present in an amount of about 0.5% of the composition.

In a preferred embodiment, the composition used to treat the pork comprises about 98.4% carrier, about 1.1% enzyme mixture and about 0.5% processing aid.

In one embodiment, the pork provided is partially or completely skinned, boned or both. In another embodiment, the method additionally comprises removing waste products or excess fat or both from the pork.

In another embodiment, the pork provided is an amount between about 0.1 kg and about 10,000 kg. In yet another embodiment, the pork provided is an amount between about 100 kg and 6000 kg.

In one embodiment, the ratio of weight of the composition to the total weight of the pork being treated with the composition is between about 1:200 and about 1:1500. In another embodiment, the ratio of weight of the composition to the total weight of the pork being treated with the composition is between about 1:450 and about 1:650.

In a preferred embodiment, treating the pork comprises injecting the pork with a solution comprising the composition. In a particularly preferred embodiment, the solution injected additionally comprises ice, NaCl and potable water. In another preferred embodiment, the solution injected is between about 6% and about 15% of the weight of the pork being injected. In a particularly preferred embodiment, the solution injected is about 10% of the weight of the pork being injected.

In one embodiment, the method further comprises adding to the pork one or more than one substance selected from the group consisting of flavoring, NaCl, moisture enhancing agents, preservatives, and potable water. In another embodiment, the method further comprises tumbling the treated pork at a pressure and rotation speed selected to more evenly distribute the enzyme mixture throughout the treated pork. In a preferred embodiment, the pressure is a near vacuum. In another preferred embodiment, the rotation speed is about between about 10 and about 15 revolutions per minute.

In a preferred embodiment, the method further comprises exposing the treated pork to a relative vacuum a closed container, such as a polymer bag. In a particularly preferred embodiment, the relative vacuum is about −1.5 bar.

In one embodiment, the method further comprises packaging the treated pork in a commercial package. In a preferred embodiment, the method further comprises cooking the treated pork. In a particularly preferred embodiment, cooking the treated pork comprises raising the core temperature of the treated pork to about 65° C.

In another embodiment, the method further comprises distributing the treated pork to an intermediate wholesale or retail establishment.

DESCRIPTION

According to one embodiment of the present invention, there is provided an enzyme mixture that can be used to treat pork to produce a product that can be cooked using conventional methods, and that results in a post-preparation product that is consistently tender. The enzyme mixture comprises three enzymes: bromelin, ficin and papain. According to another embodiment of the present invention, there is provided a method of tenderizing pork to produce a product that can be cooked by conventional methods, and that results in a post-preparation product that is consistently tender. The method comprises treating the pork with an enzyme mixture according to the present invention. The enzyme mixture and method will now be disclosed in detail.

As used in this disclosure, "consumer" refers to the individual or enterprise that cooks the treated pork for eventual human consumption, and includes an individual at home, and a cook in a restaurant or a food service enterprise, among others as will be understood by those in the art with reference to this disclosure.

As used in this disclosure, percent amounts are given in percent by weight of total weight.

In one embodiment, the present invention is an enzyme mixture that can be used to treat pork according to the present invention. The enzyme mixture comprises three proteolytic enzymes, and can comprise one or more than one additional substance. Each enzyme in the enzyme mixture has a specific activation temperature and a deactivation temperature. When used to treat pork together and in the proper ratios, cooking the pork causes the enzymes to work synergistically to break down the substance of the pork and results in a post-preparation product that is consistently tender and suitable for human consumption.

In a preferred embodiment, the enzyme mixture consists of the three enzymes bromelin, ficin and papain. In a particularly preferred embodiment, three enzymes are combined in specific ratios. Suitable enzymes can be obtained from All American Seasonings, Inc., Denver, Colo. US.

In a preferred embodiment, the enzyme mixture consists of between about 98.7% and about 99.7% bromelin, between about 0.02% and about 0.08% ficin and between about 0.01% and about 0.05% papain. In another preferred embodiment, the enzyme mixture consists of between about 99% and about 99.4% bromelin, between about 0.04% and about 0.06% ficin and between about 0.02% and about 0.04% papain. In a particularly preferred embodiment, the enzyme mixture consists of about 98.2% bromelin, about 0.05% ficin and about 0.03% papain.

In one embodiment of the present invention, there is provided a composition for tenderizing pork. The composition comprises the enzyme mixture of the present invention and further comprises a carrier. The carrier assists in dispersing the enzyme mixture evenly in a solution and assists in preventing the enzyme mixture from clumping together and from hardening during storage. In a particularly preferred embodiment, the carrier is NaCl, available from All American Seasonings, Inc. though other salts, such as KCl or dextrose, or any other suitable carrier can be used, as will be understood by those with skill in the art with reference to this disclosure.

In another embodiment of the present invention, the composition further comprises a processing aid that assists in preventing the enzyme mixture from clumping together and from hardening during storage. In a particularly preferred embodiment, the processing aid is refined, bleached and odorless soybean oil (available from All American Seasonings, Inc.).

In a preferred embodiment, the enzyme mixture is present in an amount of between about 0.5% and about 6% of the composition. In another preferred embodiment, the enzyme mixture is present in an amount of between about 0.7% and about 2% of the composition. In a particularly preferred embodiment, the enzyme mixture is present in an amount of about 1% of the composition.

In a preferred embodiment, the carrier is present in an amount of between about 25% and about 99% of the composition. In another preferred embodiment, the carrier is present in an amount of between about 50% and about 99%. In a particularly preferred embodiment, the carrier is present in an amount of about 98.5%.

In a preferred embodiment, the processing aid is present in an amount of between about 0.1% and about 2%. In another preferred embodiment, the processing aid is present in an amount of between about 0.3% and about 1%. In a particularly preferred embodiment, the processing aid is present in an amount of about 0.5%.

According to a preferred embodiment of the present invention, the composition comprises 98.4% carrier, 1.1% enzyme mixture in the ratios given above, and 0.5% processing aid.

In another embodiment of the present invention, there is provided a method of tenderizing pork to produce a product that can be cooked by conventional methods, and that results in a post-preparation product that is consistently tender. In summary, the method comprises at least the following two steps. First, a suitable type or grade of pork is provided. As used in this disclosure, the terms "type" and "grade" are interchangeable. Second, the suitable grade of pork is treated with an enzyme mixture according to the present invention.

The suitable grade of pork provided is preferably pork that potentially would be undesirably tough after being cooked by conventional methods. The pork can be partially or completely skinned, boned or both. Additionally, waste products, such as connective tissue, or excess fat can be removed. The amount of pork provided can be any amount that can be handled by equipment available to perform the method of the present invention. For example, the amount can be between about 0.1 kg and about 10,000 kg. In a preferred embodiment, the amount is between about 100 kg and about 6000 kg.

Treatment of the pork with an enzyme mixture according to the present invention can be accomplished using a variety of methods. In a preferred embodiment, the pork is injected with a solution containing the enzyme mixture using commercially available injection equipment, such as the Fomaco Injector, Robert Reiser Co., Canton, Mass. US, though any suitable injection equipment can be used as will be understood by those in the art with reference to this disclosure. Preferably, the sites of injection are less than about 7.5 cm apart. In a particularly preferred embodiment, the pork is injected with a solution containing the composition.

In one embodiment, the weight ratio of composition to pork is between about 1:200 and about 1:1500. In a preferred embodiment, the ratio of composition to pork is between about 1:450 and about 1:650.

For example, pork that is to be cooked by grilling or microwaving can be injected with a solution of the composition, ice, NaCl and potable water in a ratio of 1:13:1.7:55. Similarly, pork that is to be cooked by a convention gas or an electric oven can be injected with a mixture of the composition, ice, NaCl and potable water in a ratio of 1:20:2.5:80. The ice is used to cool the injection solution before injection to retard spoilage and melts during the injection process.

In one embodiment, the amount of the solution injected is between about 6% and about 15% of the weight of the pork being injected. In a preferred embodiment, the amount of the solution injected is about 10% of the weight of the pork being injected.

In a preferred embodiment, the method further comprises adding one or more than one substance selected from the group consisting of flavoring such as spices, NaCl, moisture enhancing agents such as sodium phosphate, preservatives such sodium lactate, and potable water to the pork to improve the taste, texture or other property of the finished product.

In another preferred embodiment, the method further comprises tumbling the treated pork at a pressure and rotation speed selected to more evenly distribute the enzyme mixture or composition throughout the treated pork. The pressure and rotation speed are chosen so as to separate the fibers of treated pork without shredding or tearing apart the fibers permanently, that is, while retaining the fibers' structural cohesiveness. In a preferred embodiment, the tumbling is performed in a near vacuum at between about 10 and about 15 revolutions per minute for between about 15 and about 30 minutes. The near vacuum combined with the rotation separates the muscle fibers of the treated pork allowing more rapid and uniform distribution of the enzymes. Preferably, the treated pork is tumbled in a finned vacuum tumbler with a central sealable chamber that can be operated at a specific pressure and rotation speed such as the Model LT30, available from Lance Industries, Allenton, Wis. US or a similar device, as will be understood by those with skill in the art with reference to this disclosure.

In another preferred embodiment, the method further comprises exposing the treated pork to a relative vacuum in a closed container. Containers are selected that can be sealed to maintain a vacuum for preserving the pork. In one embodiment, the container is a polymer bag, such as available from W. R. Grace & Co., Sioux City, Iowa. After selecting a suitable container, the treated pork is placed in the container and a vacuum is applied. In a preferred embodiment, the vacuum is a near vacuum of about −1.5 bar. The container tends to assume the shape of the pork upon application of the vacuum.

In another preferred embodiment, the method further comprises packaging the treated pork in a suitable commercial package for shipping and storage, or in a suitable commercial package for retail distribution to a consumer, or both. Packaging can include labeling as required by local laws and branding with a trademark or trade name and can include decorative wrapping for marketing purposes.

In another preferred embodiment, the method further comprises cooking the treated pork before packaging. The cooking can be done by any suitable method as will be understood by those in the art with reference to this disclosure. For example, the treated pork can be placed in an oven or in a hot water bath. Preferably, the treated pork is cooked until its core temperature is raised to at least about 65° C. If the treated pork is cooked before packaging, then the cooked treated pork is preferably cooled also before packaging.

The treated pork can be distributed to an intermediate wholesale or retail establishment, and thereby to a consumer, or can be distributed directly to a consumer. After distribution, the consumer cooks the treated pork using conventional methods, or if the product has been cooked prior to packaging, reheats the product if desired or consumes the product without reheating. For example, the treated pork can be removed from the packaging and container and can be barbecued, grilled, microwaved, prepared on a stove top or in an oven, or cooked using another conventional method, and the post-preparation product is consistently tender and suitable for human consumption.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A method of tenderizing pork, the method comprising:
 a) providing a suitable amount of pork; and
 b) treating the pork with a composition comprising an enzyme mixture; and
 where the enzyme mixture consists of between about 98.7% and about 99.7% bromelin, between about 0.02% and about 0.08% ficin and between about 0.01% and about 0.05% papain.

2. The method of claim 1, where the enzyme mixture consists of between about 99% and about 99.4% bromelin, between about 0.04% and about 0.06% ficin and between about 0.02% and about 0.04% papain.

3. The method of claim 1, where the enzyme mixture consists of about 98.2% bromelin, about 005% ficin and about 0.03% papain.

4. The method of claim 1, where the enzyme mixture is present in an amount of between about 0.05% and about 6% of the composition.

5. The method of claim 1, where the enzyme mixture is present in an amount of between 0.7% and about 2% of the composition.

6. The method of claim 1, where the enzyme mixture is present in an amount of about 1% of the composition.

7. The method of claim 1, where the composition used to treat the pork additionally comprises a carrier.

8. The method of claim 7, where the carrier is NaCl.

9. The method of claim 7, where the carrier is present in an amount of between about 25% and about 99% of the composition.

10. The method of claim 7, where the carrier is present in an amount of between about 50% and about 99% of the composition.

11. The method of claim 7, where the carrier is present in an amount of about 98.5% of the composition.

12. The method of claim 1, where the composition used to treat the pork additionally comprises a processing aid.

13. The method of claim 12, where the processing aid is soybean oil.

14. The method of claim 12, where the processing aid is present in an amount of between about 0.1% and about 2% of the composition.

15. The method of claim 12, where the processing aid is present in an amount of between about 0.3% and about 1% of the composition.

16. The method of claim 12, where the processing aid is present in an amount of about 0.5% of the composition.

17. The method of claim 1, where the composition used to treat the pork comprises about 98.4% carrier, about 1.1% enzyme mixture and about 0.5% processing aid.

18. The method of claim 1, where the pork provided is partially or completely skinned, boned or both.

19. The method of claim 1, additionally comprising removing waste products or excess fat or both from the pork.

20. The method of claim 1, where the pork provided is an amount between about 0.1 kg to about 10,000 kg.

21. The method of claim 1, where the pork provided is an amount between about 100 kg and 6000 kg.

22. The method of claim 1, where the ratio of weight of the composition to the total weight of the pork being treated with the composition is between about 1:200 and about 1:5000.

23. The method of claim 1, where the ratio of weight of the composition to the total weight of the pork being treated with the composition is between about 1:450 and about 1:650.

24. The method of claim 1, where treating the pork comprises injecting the pork with a solution comprising the composition.

25. The method of claim 24, where the solution injected additionally comprises ice, NaCl and potable water.

26. The method of claim 24, where the solution injected is between about 6% and about 15% of the weight of the pork being injected.

27. The method of claim 24, where the solution injected is about 10% of the weight of the pork being injected.

28. The method of claim 1, further comprising adding to the pork one or more than one substance selected from the group consisting of flavoring, NaCl, moisture enhancing agents, preservatives, and potable water.

29. The method of claim 1, further comprising tumbling the treated pork at a pressure and rotation speed selected to more evenly distribute the enzyme mixture throughout the treated pork.

30. The method of claim 29, where the rotation speed is about between about 10 to about 15 revolutions per minute.

31. The method of claim 1, further comprising exposing the treated pork to a relative vacuum in a closed container.

32. The method of claim 31, where the closed container is a polymer bag.

33. The method of claim 31, where the relative vacuum is about −1.5 bar.

34. The method of claim 1, further comprising packaging the treated pork in a commercial package.

35. The method of claim 1, further comprising cooking the treated pork.

36. The method of claim 35, where cooking the treated pork comprises raising the core temperature of the treated pork to about 65° C.

37. The method of claim 1, further comprising distributing the treated pork to an intermediate wholesale or retail establishment.

* * * * *